Figure 1:
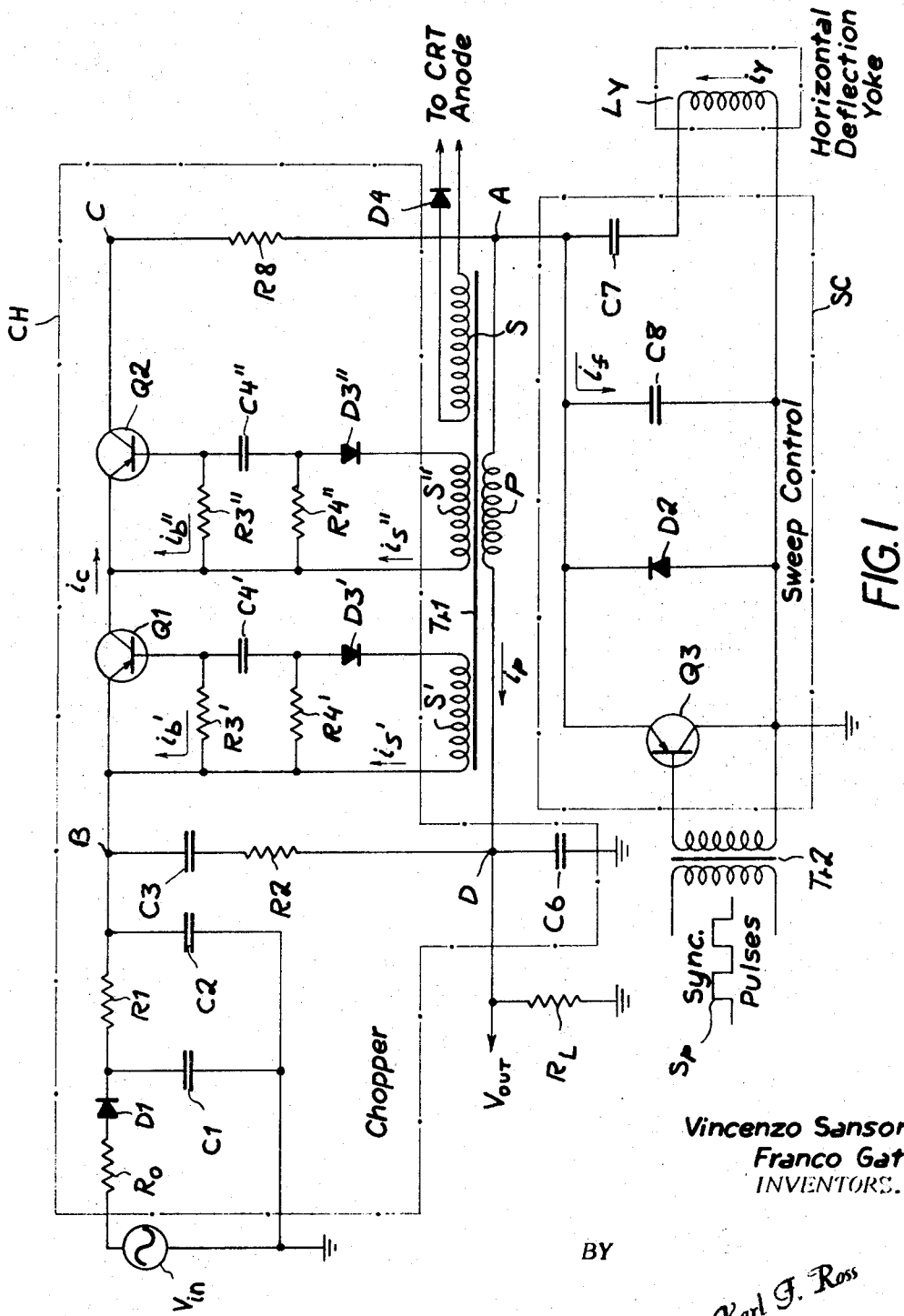

United States Patent

[11] 3,594,499

[72] Inventors: Vincenzo Sansone; Franco Gatti, both of Pavia, Italy
[21] Appl. No.: 802,868
[22] Filed: Feb. 27, 1969
[45] Patented: July 20, 1971
[73] Assignee: Ates Componenti Electronici S.P.A. Milan, Italy
[32] Priority: Mar. 8, 1968
[33] Italy
[31] 13,734

[54] VOLTAGE-STEPDOWN CIRCUIT ARRANGEMENT FOR TELEVISION POWER SUPPLY
9 Claims, 2 Drawing Figs.

[52] U.S. Cl. .................................................. 178/7.3 R, 178/DIG. 11
[51] Int. Cl. .................................................. H04n 5/00
[50] Field of Search ...................................... 178/6 PS, 7.1, 7.2, 7.3, 7.5

[56] References Cited
UNITED STATES PATENTS
3,510,578   5/1970   Bazin............................ 178/7.1

Primary Examiner—Richard Murray
Attorney—Karl F. Ross

ABSTRACT: In order to provide a reduced output voltage for feeding a transistorized load, a rectified supply voltage from an AC utility outlet is chopped under the control of a recurrent pulse in the load circuit, specifically the flyback pulse of the horizontal sweep circuit of a television receiver, with the aid of a normally blocked transistor connected to be unblocked by an intermittent biasing current from a secondary winding of a transformer whose primary winding acts as an inductance of a smoothing network for the chopped supply voltage.

Vincenzo Sansone
Franco Gatti
INVENTORS.

BY

Karl J. Ross
Attorney

VOLTAGE-STEPDOWN CIRCUIT ARRANGEMENT FOR TELEVISION POWER SUPPLY

Our present invention relates to a power supply designed to step down the voltage of an available AC or DC source of electric energy, such as an outlet from the utility mains of a building, for feeding a low-voltage direct-current load.

In a television receiver, for example, voltages of not more than approximately 30 v. are required to drive a transistorized final stage if ordinary, overload-sensitive germanium-type transistors are used. The conventional expedient of using a step-down transformer and rectifying its output, though technically suitable, presents the disadvantages of bulk and elevated cost, the latter in some cases amounting to as much as 10 percent of the cost of all active and passive components of the power supply.

Thus, the principal object of our invention is to provide a voltage-step-down circuit arrangement for the purpose described which reduces volume, weight and cost of a power supply incorporating same and which is particularly adapted for transistorized electronic equipment such as television receivers.

A more specific object is to provide a power supply network utilizing, for the most part, components conventionally present in a television receiver for the purpose of generating a low-voltage direct-current supply.

These objects are realized, pursuant to our present invention, by the provision of a chopper in the form of one or more normally blocked transistors inserted between an input circuit and a load circuit, in combination with control means for periodically unblocking the transistor or transistors to generate a pulse train which is then integrated by an impedance path in the transistor output. With the input circuit connected to a source of substantially constant unipolar or alternating voltage (and including the usual rectifying and smoothing circuitry in the latter case), the integrated output voltage has a magnitude which is a fraction of the level of the input voltage as determined by the frequency and direction of the control pulses delivered to the chopper.

According to a more specific feature of our invention, the integrating circuit in the output of the chopping transistor or transistors includes the primary winding of a transformer having a secondary winding connected across the input of each chopping transistor, the current flow in this secondary winding serving to unblock the transistor in the rhythm of a train of synchronizing pulses applied to a scanner of a television tube, preferably to the horizontal sweep circuit thereof; this scanner is coupled to the integrating circuit in the chopper output so as to unblock the chopping transistor or transistors during a specific phase of each scanning sweep, advantageously during the flyback stroke. Thus, the horizontal sweep circuit associated with a deflecting yoke of a cathode-ray tube may include a flyback condenser on which a voltage builds up during the retrace period, this voltage pulse being transmitted to the chopper through the inductively coupled primary and secondary windings referred to. In order to limit the duration of the output pulse of the chopper to substantially the length of a retrace period, we prefer to insert a differentiation circuit between the transistor input and the associated transformer secondary.

Conveniently, the transformer controlling the chopper may be a component conventionally provided in a television power supply for delivering a stepped-up voltage to a high-voltage electrode of the receiver, such as the final accelerating anode of the picture tube. In this case, only a few turns of winding need to be added to such a preexisting transformer to drive the chopper.

Although, in principle, the chopper need only include a single transistor, the use of several (e.g., two) such devices in cascade enables the utilization of relatively cheap commercial transistors since the voltage drop developed thereacross during cutoff will be correspondingly reduced by the series connection of their main electrodes (usually, emitters and collectors).

Figure 2:
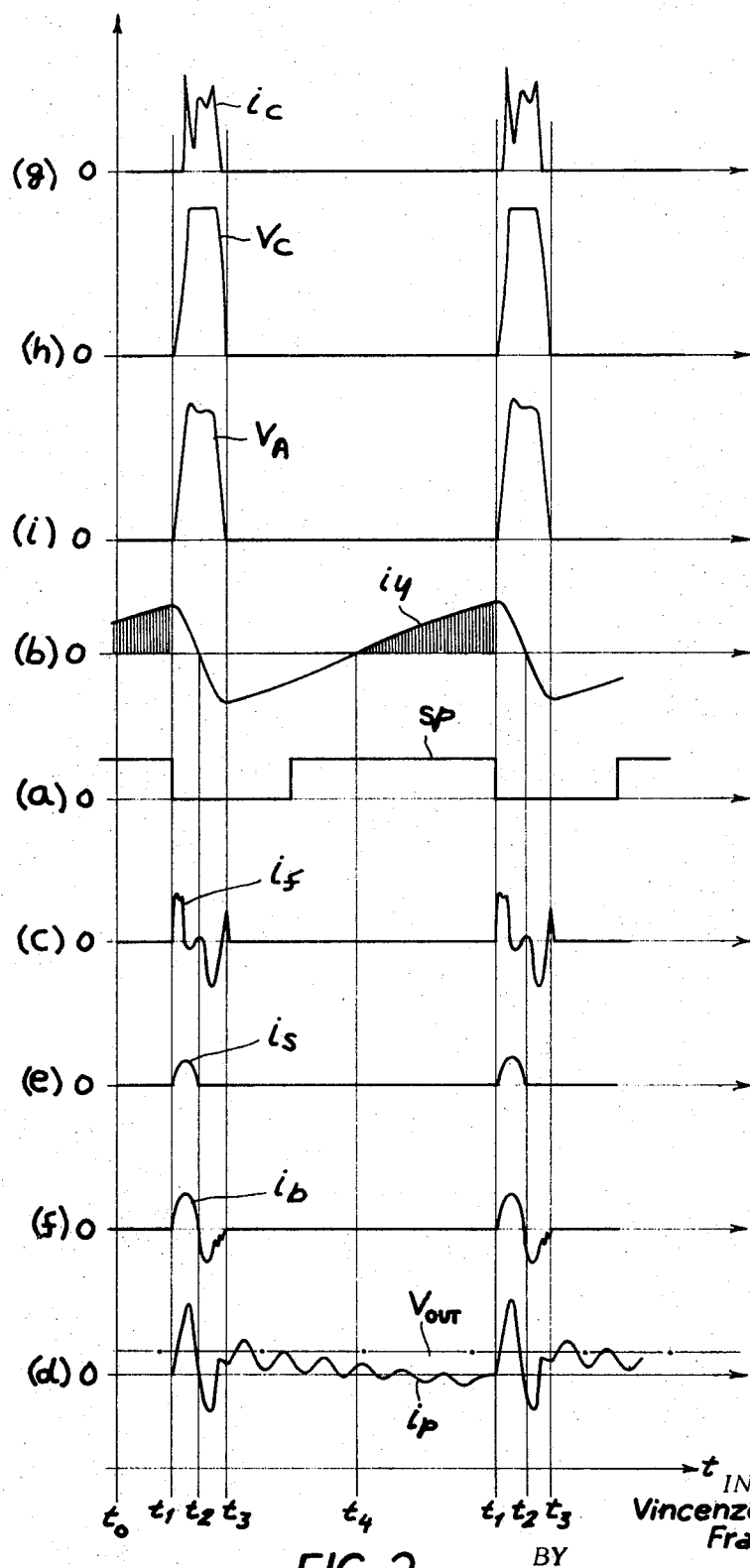

The invention will be described in greater detail with reference to the accompanying drawing in which:

FIG. 1 is a circuit diagram of a power supply network representing an illustrative embodiment; and FIG. 2 is a set of graphs relative to the operation of the network of FIG. 1.

The supply network shown in FIG. 1 comprises a source of alternating input voltage $V_{in}$ constituted, for example, by a utility outlet of 220 v. r.m.s. This voltage is rectified in a circuit shown to include an input resistor $R_0$ (which may form part of the internal resistance of the source), a diode D1 and an RC network composed of a series resistor R1 and two shunt condensers C1, C2. The output terminal B of this network is connected to ground through a series circuit including a condenser C3, a resistor R2 and a further condenser C6, the latter being shunted by a load resistor $R_L$ across which a reduced output voltage $V_{out}$ is developed. Point B is also connected to the emitter of a first transistor Q1, shown to be of the PNP type, whose collector is tied to the emitter of a similar second transistor Q2; the output terminal C of transistor Q2, joined to the collector thereof, is connected through a ballast resistor R8 to a point A whence the primary winding P of a transformer Tr1 extends to the junction D of condenser C6 and resistor R2.

Transformer Tr1 has two secondaries S', S'' respectively connected across the emitter and base electrodes of transistors Q1 and Q2 in series with respective diodes D3', D3'' and condensers C4', C4''; the latter condensers form part of two identical differentiation circuits including respective pairs of shunt resistors R3', R4' and R3'', R4''. A further secondary winding S of transformer Tr1 supplies a stepped-up voltage, by way of a rectifying circuit here simply represented by a diode D4, to a high-voltage anode of an associate cathode-ray tube not further illustrated, this tube being provided with the usual scanning means including a horizontal sweep-control circuit SC and an electromagnetic yoke simply shown as a coil $L_y$.

Sweep-control circuit SC comprises a storage condenser C7 connected, in series with coil $L_y$, between ground and junction A, this series combination being further shunted by a flyback condenser C8 of substantially lower capacitance than condenser C7, a diode D2, and the emitter-collector circuit of an auxiliary transistor Q3 whose base and collector periodically receive synchronizing pulses $sp$ from a source not shown by way of a transformer Tr2.

Reference will now be made to FIG. 2 for a description of the mode of operation of the chopper CH and the sweep-control circuit SC of FIG. 1.

When the chopper is first connected across source $V_{in}$, e.g., via a manual switch not shown, the resulting voltage surge at point B drives the junction A positive, thereby charging the initially discharged condensers C7 and C8 through the reactive circuit C3, R2, P bypassing the blocked transistors Q1, Q2. This charging step is significant only during cut-in since, as will presently become apparent, the condensers C7 and C8 are periodically recharged through the chopper CH during steady-state operation.

At a time $t_0$, FIG. 2, the electronic switch constituted by transistor Q3 is assumed to be closed by an unblocking pulse $sp$, graph (a). A current $i_y$, graph (b), passes at this instant through yoke $L_y$ in the direction indicated by an arrow in FIG. 1 (taken as positive), thereby discharging the condenser C7 through transistor Q3 at a rate determined by the resonance frequency of the tuned series circuit $L_y$, C7. At instant $t_1$, pulse $sp$ terminates so that transistor Q3 cuts off whereupon the yoke current $i_y$ flows into condenser C8 which charges up at a rate depending on the resonance frequency of series reactances $L_y$, C8 (it being assumed that the capacitance of condenser C7 is so much larger than that of condenser C8 as to have only a negligible effect upon the charging of the latter). This charging of condenser C8, by a current flow $i_f$ also shown in graph (c) of FIG. 2, begins to raise the potential of point A whereby a current surge $i_p$ through primary P is initiated, the direction of this surge (arrow in FIG. 1) being here taken as positive; see also graph (d) of FIG. 2. This surge, in turn, gives rise to a secondary current $i_s'$, $i_s''$ in each of windings S', S'', as indicated at $i_s$ in graph (e) of FIG. 2. Differentiation of this current flow by the aforedescribed circuits gives rise to base currents $i_b'$, $i_b''$ also illustrated at $i_b$ in graph (f) of FIG. 2. The resultant flow of collector current $i_c$ through transistors Q1 and Q2 in series has been plotted in graph (g). This current flow, in turn, sharply raises the potential $V_C$ of point C and entrains a similar rise in the potential $V_A$ of point A as indicated in graphs (h) and (i), respectively.

At instant $t_2$ the flyback current $i_f$ stops, primary current $i_p$ reverses, secondary current $i_s$ ceases and the base current $i_b$ goes negative. Owing to the finite sweepout time of transistors Q1 and Q2, however, the flow of collector current $i_c$ continues for a short period, terminating approximately at time $t_3$. During the interval $t_2-t_3$, condenser C8 has discharged through inductance $L_y$ and capacitor C7, the flow of negative yoke current $i_y$ continuing beyond instant $t_3$ by way of diode D2 which becomes conductive as soon as point A is driven negative, with reference to ground, by the inverted flyback current. At this stage, however, the yoke current is again controlled by the reactances $L_y$, C7 to the exclusion of the capacitance C8 which has been short circuited by the diode D2. Thus, as illustrated in graph (b) of FIG. 2, the substantially linear rise in yoke current is more gradual than its descent during the flyback interval $t_1-t_3$.

At some point between time $t_3$ and the instant $t_4$ when current $i_y$ goes to zero, a new synchronizing pulse sp appears in the input of switching transistor Q3. The resulting unblocking of this transistor takes effect, however, only upon the reversal of the yoke current at the instant $t_4$ whereupon this current again flows through the transistor as previously described for the instant $t_0$, the cycle being then repeated. The flow of yoke current $i_y$ through the transistor Q3 has been indicated in graph (b) by vertical shading.

Impedances P, C6 and $R_L$ represent an integrating circuit which substantially maintains the load voltage $V_{out}$, i.e., the potential of point D, at an average level of, say, 30 v. as also indicated in graph (d) of FIG. 2. With the potential of point B held at approximately 280 v., the resistor R8 may be dimensioned to establish the peak of voltage pulse $V_C$ at about 250 v.

It will be noted that the potential of point A, graph (i), is not changed during the forward sweep of the beam in the period $t_3-t_1$ so that the linearity of that sweep inherent in the design of the control circuit SC is not affected.

The output voltage $V_{out}$ may be used to control the vertical beam deflection, to energize the generator of synchronizing pulses sp and to drive other equipment in the audio or video channels of the television receiver containing the aforementioned cathode-ray tube. Naturally, transformer Tr1 may have additional secondary windings leading to other loads and, if desired, inductances similar to coil $L_y$ may be energized in parallel therewith or may be included in other series-resonant circuits branched across condenser C8.

We claim:
1. A power supply network for converting a continuous supply voltage into a reduced continuous output voltage, comprising an input circuit connected to receive said supply voltage, a load circuit, circuit means including normally blocked transistor means connecting said input circuit across said load circuit, and control means for periodically unblocking said transistor means to generate a pulse train in the output thereof, said circuit means further including impedance means in cascade with said transistor means for integrating said pulse train, said impedance means comprising a primary winding and said control means comprising a secondary winding inductively coupled to said primary winding.

2. A network as defined in claim 1 wherein said windings are part of a transformer also having a voltage-stepup load winding, said load circuit including a high-voltage electrode connected to be energized from said load winding.

3. A network as defined in claim 2 wherein said load circuit comprises a part of a television receiver with a cathode-ray tube provided with said electrode.

4. A network as defined in claim 1 wherein said load circuit comprises part of a television receiver provided with a sweep circuit including a source of synchronizing pulses, said primary winding being coupled to said sweep circuit for energization in the rhythm of said synchronizing pulses.

5. A network as defined in claim 4 wherein said sweep circuit comprises coil means, a storage condenser in series with said coil means, a flyback condenser of lower capacitance than said storage condenser shunting the series combination of said storage condenser and said coil means, unidirectionally conductive electronic switch means bridged across said flyback condenser and connected to said source for periodically establishing a discharge path for said storage condenser by way of said coil means, and diode means connected in parallel with said switch means but with opposite polarity to give passage to a return flow recharging said storage condenser at a rate determined by the inductance of said coil means, said sweep circuit being connected across the output of said transistor means in parallel with said impedance means for energizing said primary winding in response to a voltage pulse developed across said flyback condenser.

6. A network as defined in claim 5, further comprising a resistor in the output of said transistor means connected in series with both said impedance means and said sweep circuit.

7. A network as defined in claim 5, further comprising a reactive starting circuit bypassing said transistor means and extending from said input circuit to said condensers for initially charging same upon application of said supply voltage thereto.

8. A network as defined in claim 5 wherein said control means further comprises a differentiation circuit inserted between said secondary winding and said transistor means for biasing the latter into conductivity during only an initial part of said voltage pulse.

9. A network as defined in claim 1 wherein said transistor means comprises a pair of substantially identical transistors connected in cascade.